C. H. BRATTON.
TEA KETTLE.
APPLICATION FILED MAY 6, 1912.
1,049,659.
Patented Jan. 7, 1913.
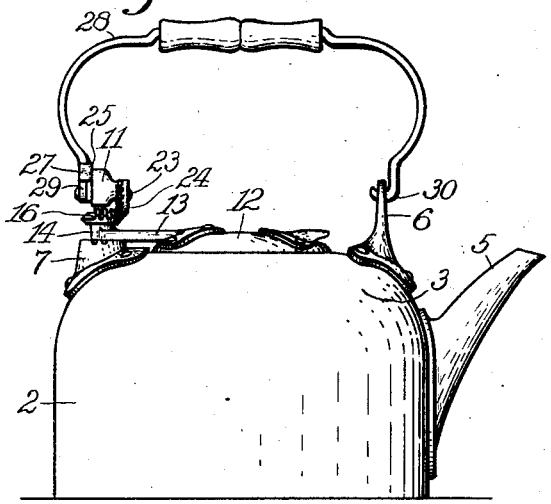
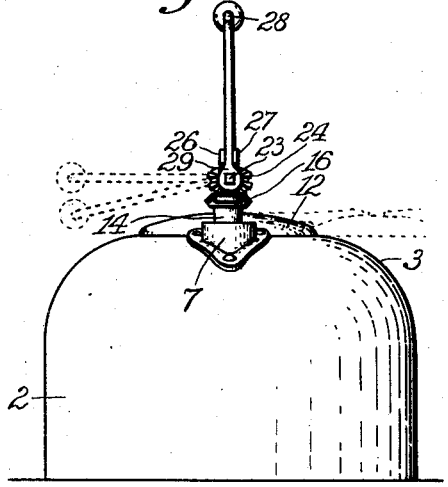
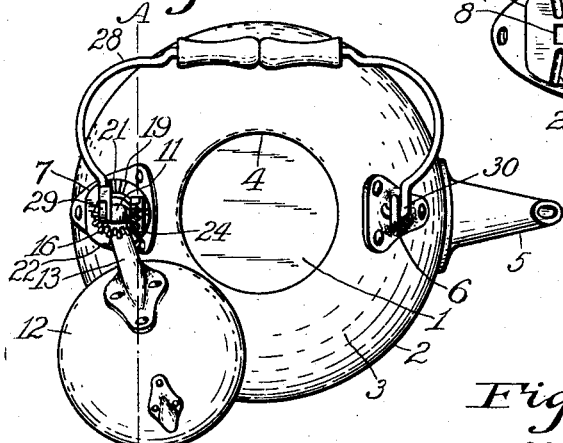
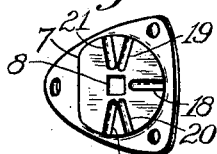
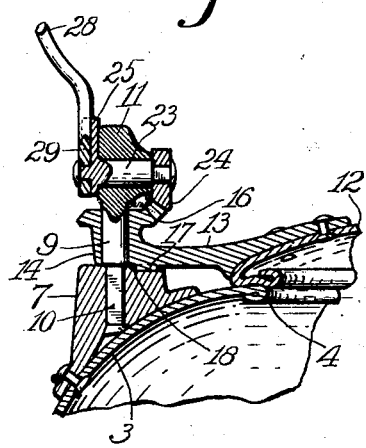
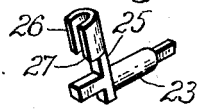
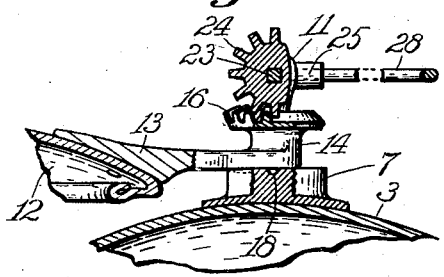
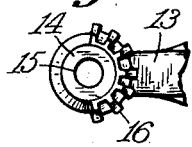
WITNESSES:
J. H. Gardner.
M. J. Messenheimer.
INVENTOR:
Carl H. Bratton,
BY
E. T. Silvius,
ATTORNEY.

UNITED STATES PATENT OFFICE.

CARL H. BRATTON, OF WALNUT TOWNSHIP, MONTGOMERY COUNTY, INDIANA.

TEA-KETTLE.

1,049,659.  Specification of Letters Patent.  Patented Jan. 7, 1913.

Application filed May 6, 1912. Serial No. 695,443.

*To all whom it may concern:*

Be it known that I, CARL H. BRATTON, a citizen of the United States, residing in Walnut township, in the county of Montgomery and State of Indiana, have invented a new and useful Tea-Kettle, of which the following is a specification, reference being had to the accompanying drawings and to the letters and figures of reference marked thereon.

This invention relates to vessels commonly known as tea-kettles or other water-holding vessels that require lids or covers, the invention having reference more particularly to means for holding the lid on the vessel or for moving the lid to uncover the vessel.

An object of the invention is to provide an improved tea-kettle or the like vessel including its lid or cover that shall be so constructed that when carrying the vessel or pouring water therefrom, the lid may be prevented from falling off from the vessel and exposing the hand of the user to the hot escaping vapor or steam.

Another object of the invention is to provide means for accomplishing the above mentioned purpose which shall permit the user to move the lid from the vessel without exposing the hand to the escaping vapor or steam.

A still further object is to provide lid-controlling means which will permit the vessel to be carried with the lid in the open position.

With the above mentioned and other objects in view, the invention consists in a vessel comprising a lid and a carrying bail provided with gearing connecting the bail with the lid and adapted to retain the lid in closed position when the bail is in carrying position, the gear enabling the lid when in closed position to hold the bail uprightly away from the vessel so as to not become heated by contact with the vessel, the gearing enabling the bail when moved to an approximately horizontal position to move the lid over to uncover the body of the vessel.

The invention consists also in the novel parts and in the combinations and arrangement of parts as hereinafter particularly described and claimed.

Referring to the drawings, Figure 1 is a side elevation of a tea-kettle constructed substantially in accordance with the invention; Fig. 2, a rear elevation; Fig. 3, a top plan; Fig. 4, a top plan of one of the parts of the invention; Fig. 5, a fragmentary vertical central section of the tea-kettle and gearing; Fig. 6, a perspective view of one of the parts of the gearing; Fig. 7, a fragmentary section on the plane of the line A A in Fig. 3, and Fig. 8, a fragmentary plan of one of the parts of the gearing.

Similar reference characters in the different figures of the drawings indicate corresponding elements or features of construction herein referred to.

As preferably constructed the vessel comprises a bottom 1 on which is a side wall 2 having a dome shaped top 3 in which is a circular aperture 4, the wall being provided with a spout 5, one portion of the top having an ear 6 thereon. A suitable base 7 is provided and secured to a portion of the top 3 at the opposite side of the aperture from the ear 6 and has a squared vertical hole 8 therein. An axle-post 9 is provided which has a squared shank 10 on one end thereof that is secured rigidly in the hole 8 of the base, the opposite or upper end of the axle-post having a journal box 11 thereon adapted to receive a shaft in relatively horizontal position, or at right angles to the axis of the axle-post. A suitable lid 12 is provided which is adapted to cover the aperture 4 and to slide laterally on to or from the top 3 and it is provided with an arm 13 having a hub 14 on its end, the hub having a bore 15 and being placed on the axle-post before the shank 10 is secured to the base 7, said hub being rotatable on the axle-post, and it has a toothed segment 16 thereon that extends along the side of the hub that is toward the lid, the segment occupying approximately one half of the circle concentric to the axle-post. The under side of the arm 13 adjacent to the hub has a projection 17 thereon adapted to normally extend into a recess 18 formed in the top of the base 7 on which the hub is supported, the projection being forced out of the recess and onto the top of the base when the lid is being moved to open position so as to slightly raise the lid from the top of the vessel and permit the lid to move freely about the axle-post which constitutes a pivot for the lid as well as a lifting device. The top of the base 7 has also other recesses 19 and 20 therein adapted to receive the projection 17 when the lid is in open position, and also two recesses 21 and 22 rearwardly beyond the recesses 19 and 20 to receive the projection when the lid is moved farther rearward. A shaft 23 is provided which is rotatably mounted in the journal-box 11 and a toothed segment 24 is fixed on one end thereof and normally in mesh with the segment 16 for moving the lid, the opposite end of the shaft being provided with an arm 25 having two oppositely arranged lugs 26 and 27 thereon. A suitable bail 28 is provided which has one arm 29 secured to the shaft 23 and extending between the lugs 26 and 27 to form a rigid connection with the shaft, the bail having another arm 30 connected to the ear 6 so that the bail may swing from the upright position down to the body of the vessel, the shaft 23 obviously being in alinement with the pivotal portion of the ear 6.

In practical use the lid rests upon the top 3 and covers the aperture 4 and the bail is held by the intermediate gearing in upright position so that it does not become heated. If it is desired to pour water into the vessel or insert any substance into the vessel the bail is swung over to either side until the projection 17 enters the recess 19 or 20, in which position the aperture 4 is uncovered and the bail is held in approximately horizontal position off from the body of the vessel. If it be desired to carry the vessel while uncovered, the bail may be further moved over or downward until the segment 24 becomes disconnected from the segment 16, after which the lid may be further moved until the projection 17 enters a recess 21 or 22 which prevents the lid from accidentally turning on its pivot and the bail is permitted to be moved to upright position so that the vessel may be carried. The bail may be readily moved down and the gear segments again placed in operative connection so that the lid may be again controlled as before by the bail.

Having thus described the invention, what is claimed as new is—

1. A tea-kettle including a body part comprising a dome-shaped top having an aperture therein, a base and also an ear mounted on the top of the body part, the base having an axle-post thereon provided with a journal box, a lid having an arm provided with a hub that is rotatable on the axle-post and having a toothed segment thereon, a shaft rotatively mounted in the box and having a toothed segment that is in mesh with the segment of the hub, and a bail having an arm that is fixedly secured to the shaft and an arm that is pivotally connected with the ear.

2. A tea-kettle comprising a body having an apertured dome-shaped top, an ear and a base fixed upon the top, the base having an upright axle-post thereon and also recesses in the top thereof arranged about the axle-post, the axle-post having a horizontal journal box thereon, a hub rotatable on the axle-post and having an arm thereon that is provided with a projection to enter the recesses, the hub being supported on the base and having a toothed segment thereon, a lid secured to the arm of the hub for covering the aperture in the top, a shaft rotatively mounted in the journal box and having an arm thereon provided with two lugs, a toothed segment secured to the shaft and normally in mesh with the segment of the hub, the segments being disconnectible each from the other, and a bail having an arm pivotally connected to the ear and an arm that is secured to said shaft between the two lugs.

3. A tea-kettle comprising a body part having an apertured top, an ear and a base fixed upon the top, the base having an upright axle-post thereon and also recesses in the top arranged about the axle-post, a bail having an arm pivotally connected to the ear and an arm provided with a shaft rotatively mounted in the axle-post, a toothed segment fixed on the shaft, a lid having an arm pivotally connected to the axle-post and provided with a projection to enter the recesses, the arm having also a toothed segment thereon normally in mesh with the segment on the shaft, the segments being disconnectible each from the other and permitting the bail to carry the body part with the lid in open position and held by the projection in a recess.

In testimony whereof, I affix my signature in presence of two witnesses.

CARL H. BRATTON.

Witnesses:
 Oscar M. Crouch,
 Forrest E. Graves.